J. U. FLANAGAN.
MACHINE FOR SEASONING OR FINISHING LEATHER.
APPLICATION FILED MAR. 14, 1916.
1,257,595.
Patented Feb. 26, 1918.
3 SHEETS—SHEET 2.
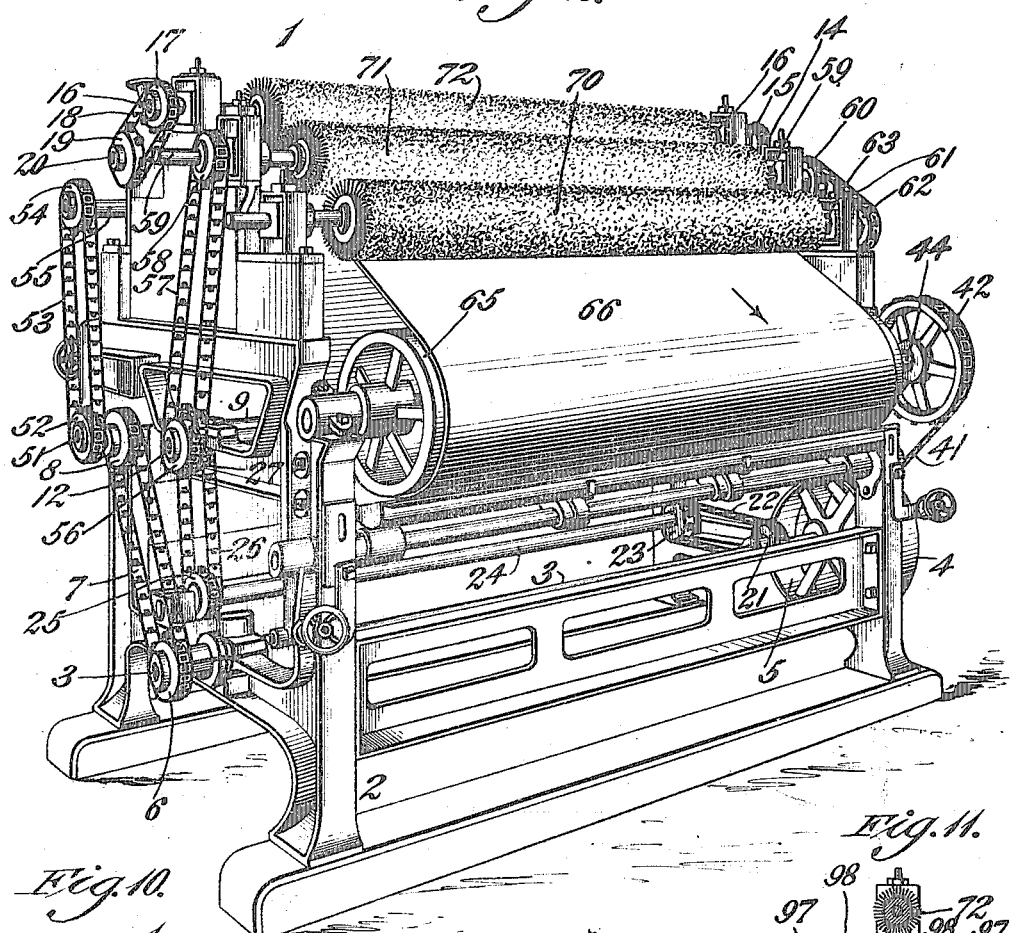
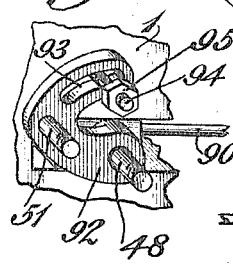
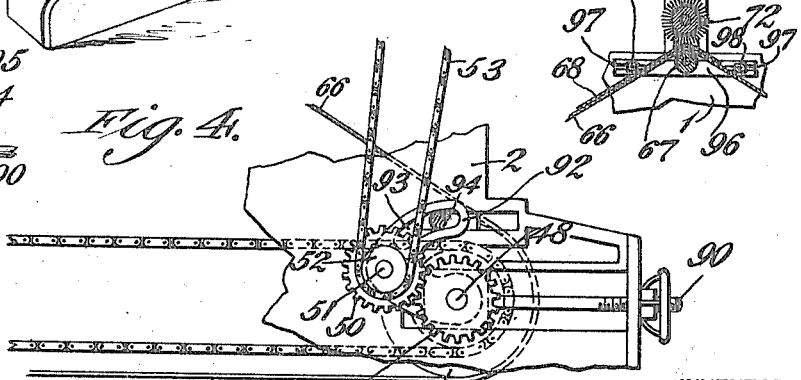
WITNESSES
INVENTOR
James U. Flanagan.
BY
ATTORNEYS

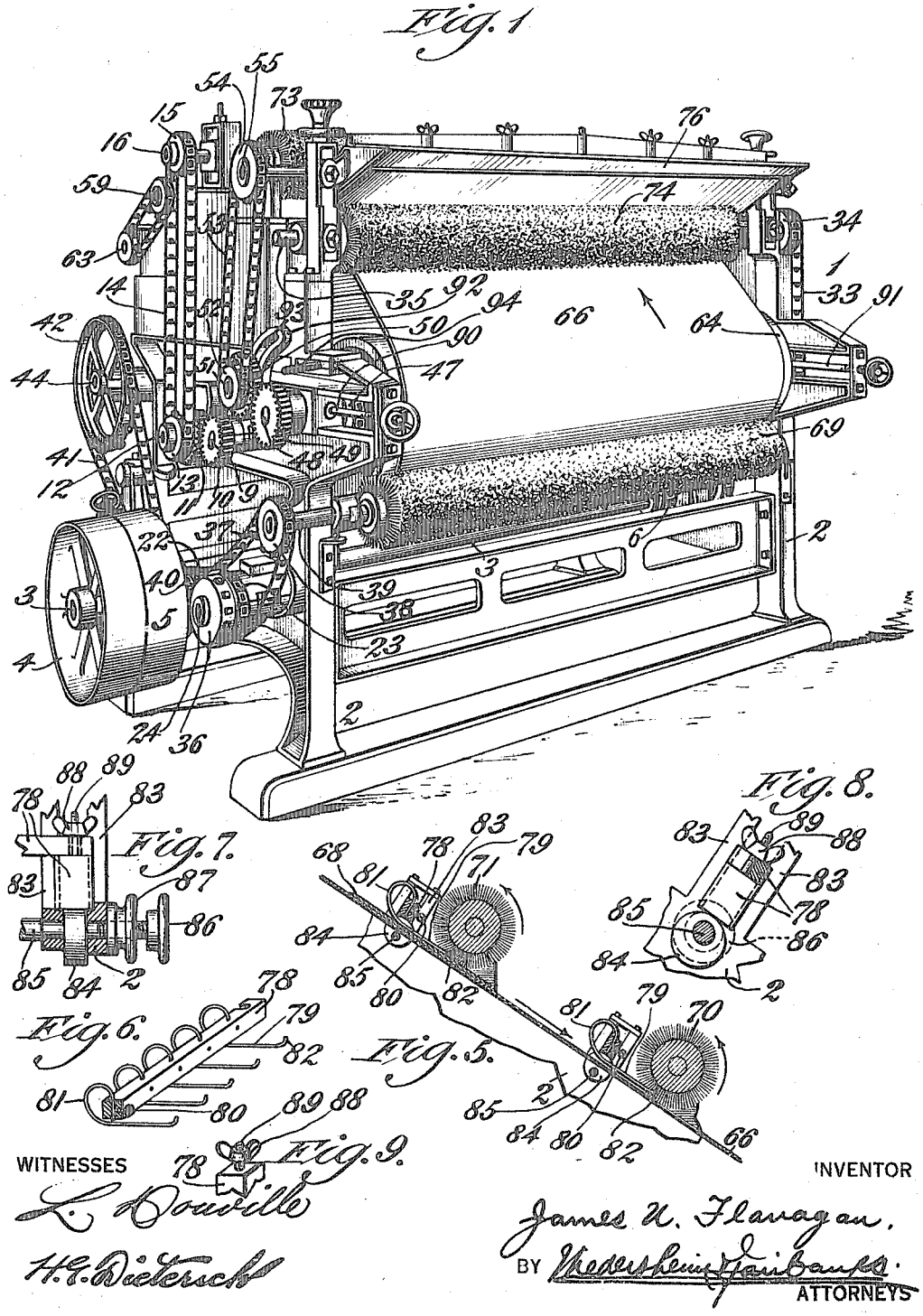

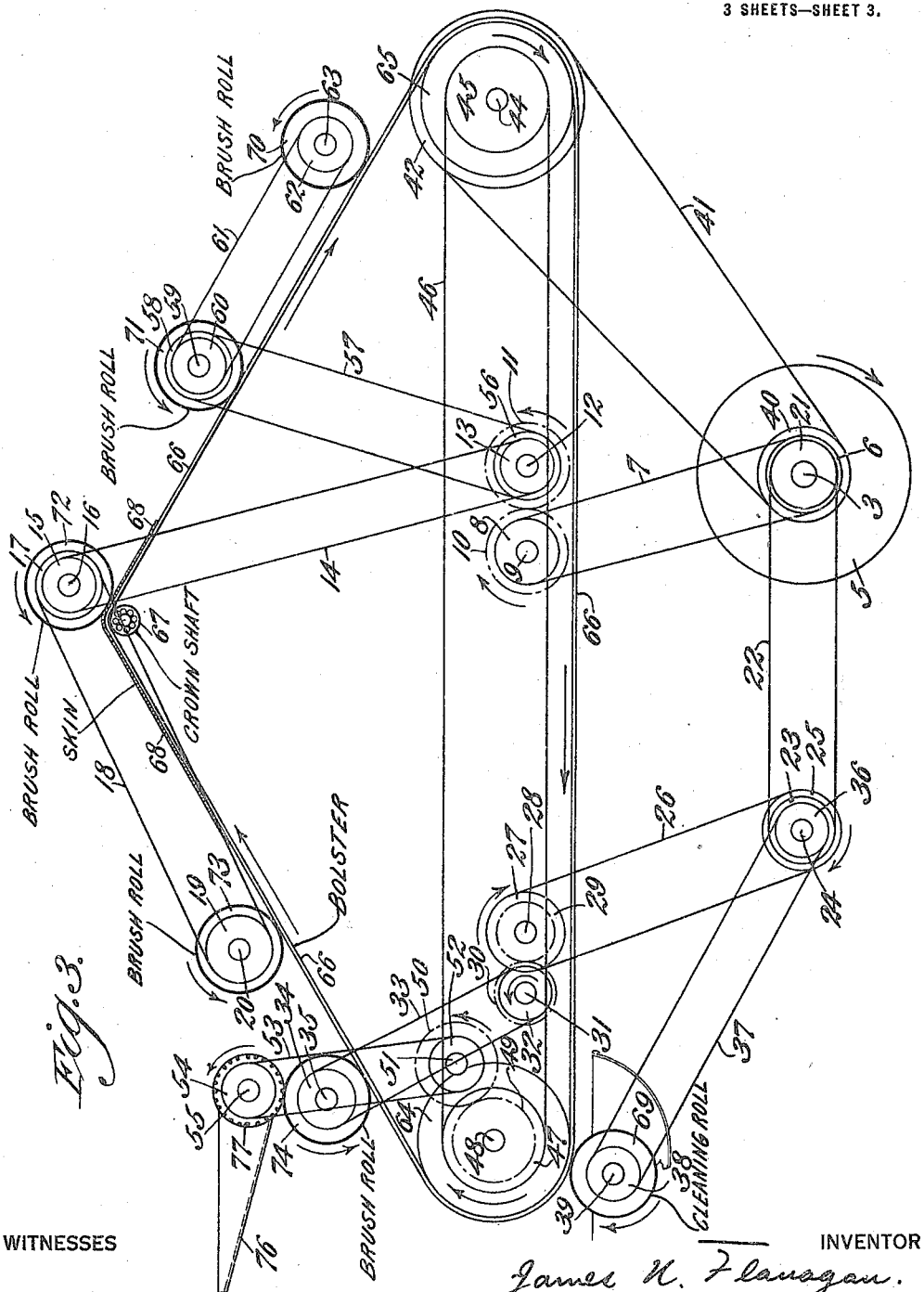

UNITED STATES PATENT OFFICE.

JAMES U. FLANAGAN, OF WILMINGTON, DELAWARE, ASSIGNOR TO F. F. SLOCOMB & CO., INCORPORATED, OF WILMINGTON, DELAWARE, A CORPORATION OF DELAWARE.

MACHINE FOR SEASONING OR FINISHING LEATHER.

1,257,595. Specification of Letters Patent. Patented Feb. 26, 1918.

Application filed March 14, 1916. Serial No. 84,033.

*To all whom it may concern:*

Be it known that I, JAMES U. FLANAGAN, a citizen of the United States, residing at Wilmington, in the county of New Castle, State of Delaware, have invented a new and useful Machine for Seasoning or Finishing Leather, of which the following is a specification.

The principal object of my invention is to spread the leather out flat in every portion during the seasoning operation. In devices heretofore employed there has always been a very considerable disadvantage on account of the liability of most all skins to be plaited or folded over in portions principally in the flank or foreshoulders of the skin. This results in what are termed "skips" or portions of the skin which remain unseasoned, or in forming what are termed "pockets" meaning a portion of the skin which has received entirely too much of the seasoning liquid which dries or cakes in the pocket and marks the skin.

My invention consists in causing the apron or bolster carrying the skin to be passed over what is termed a "crown" shaft forming a sudden bend or change of direction of the bolster, and the brush roll, which is arranged to operate either directly over the crown shaft or at a short distance beyond it, rubs the seasoning into the skin while it has been straightened or spread out flat in passing over the crown shaft.

A great advantage which inheres in this arrangement is that the skin is not only straightened but is actually stretched especially on the grain side to which the seasoning is to be applied. It will be apparent that the seasoning liquid soaks into and penetrates the grain of the skin much more readily while in its stretched or opened out condition than it could do and has done on any other appliance heretofore in use.

My invention further consists in a new arrangement of wires or bars whereby I secure greater flexibility of the same than heretofore, while at the same time giving them sufficient resiliency to hold down the skin on the traveling bolster during its approach to and passage under the brush cylinders.

My invention further consists in novel means for effecting adjustment of the bar carrying the holding down wires, whereby the position of this bar and of its wires can be very quickly adjusted with extreme nicety.

My invention further consists in an improved means of holding and securing in proper position a pin or shaft carrying a driving shaft or pulley, so that the driving chain or belt is quickly and positively tightened or loosened to any desired extent without the use of an idler for accomplishing this end.

Other novel features of construction and advantage will hereinafter more clearly appear in the detailed description.

For the purpose of illustrating my invention, I have shown in the accompanying drawings one form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of the front of a leather seasoning or finishing machine embodying my invention.

Fig. 2 represents a perspective rear view of the same machine.

Fig. 3 represents a diagrammatic view, showing the manner of assembling and collocating the power transmission devices, the brush rolls, bolster and other adjuncts.

Fig. 4 represents a side elevation of a detached portion of a machine for tightening one of the sprocket chains employed.

Fig. 5 represents a sectional view, partly in elevation, showing the brush rolls and the guiding wires juxtaposed therebetween.

Fig. 6 represents a perspective view of a bar and the guiding wires therefor employed.

Fig. 7 represents a front elevation, partly in section, showing the manner of holding the bar, seen in Fig. 6, in position.

Fig. 8 represents a side elevation, partly in section, of Fig. 7.

Fig. 9 represents a perspective view of a fastening device employed in connection with the bar seen in Figs. 6, 7 and 8. Fig. 10 represents a perspective view of an adjusting device employed. Fig. 11 represents a sectional view of the crown shaft, its brush roll and bearings for said crown shaft.

Similar numerals of reference indicate corresponding parts in the figures.

Referring to the drawings:—

1 designates my novel construction of seasoning machine, the same comprising the frame work 2, upon which are mounted the various shafts, power transmission devices, apron or bolster, and coacting brush rolls, the manner of collocating and actuating the same being capable of variation according to requirements. I have, however, shown one preferred form of apparatus which has been found in practice to give satisfactory results.

3 designates the main shaft which is mounted in suitable bearings in the lower portion of the machine and is provided with the tight and loose pulleys 4 and 5, whereby power is applied to said main shaft from any convenient source. Upon the main shaft is mounted a sprocket wheel 6 around which passes sprocket chains 7. The sprocket wheel 8 is mounted on the shaft 9 which carries the gear 10 which meshes with a gear 11, mounted on the shaft 12.

Mounted on the shaft 12 is the sprocket wheel 13 which actuates the sprocket chain 14, which actuates the sprocket wheel 15, mounted on the shaft 16, which latter carries a sprocket wheel 17, which actuates the sprocket chain 18, which actuates the sprocket wheel 19 mounted on the shaft 20.

21 designates a sprocket wheel on the main shaft 3 which actuates the sprocket chain 22 which actuates the sprocket wheel 23 on the shaft 24, which actuates the sprocket wheel 25 which actuates the sprocket chain 26 which actuates the sprocket wheel 27, mounted on the shaft 28, which also carries a gear 29, said gear meshing with the gear 30 mounted on the shaft 31 which carries the sprocket wheel 32 which actuates the sprocket chain 33, which actuates the sprocket wheel 34, mounted on the shaft 35.

36 designates a sprocket wheel mounted on the shaft 24 which actuates sprocket chain 37 which actuates the sprocket wheel 38 mounted on the shaft 39. The main shaft 3 carries a sprocket wheel 40 which actuates the sprocket chain 41, which actuates the sprocket wheel 42, mounted on the shaft 44, which shaft carries a sprocket wheel 45, which actuates the sprocket chain 46, which actuates the sprocket wheel 47 mounted on the shaft 48.

49 designates a gear wheel mounted on the shaft 48 which is in mesh with the gear 50 mounted on the shaft 51, which carries the sprocket wheel 52, which actuates the sprocket chain 53, which actuates the sprocket wheel 54, mounted on the shaft 55. The intermeshing of the gears 10 and 11 causes the rotation of the sprocket wheel 56 which is mounted on the shaft 12, said sprocket wheel 56 actuating the sprocket chain 57, which actuates the sprocket wheel 58 mounted on the shaft 59, which latter carries a sprocket wheel 60 which actuates the sprocket chain 61 which passes around the sprocket wheel 62 mounted on the shaft 63.

The shaft 48 has mounted upon it the drum 64, while the shaft 44 has mounted thereon the drum 65, around which passes the endless apron or bolster 66, the direction of travel of the latter being apparent from Fig. 3, it being seen that said apron passes over the crownshaft roller 67 so that the skin 68, during its travel over the elevated portions of the apron or bolster 66 will have its grain side somewhat stretched, so as to receive the requisite amount of the seasoning.

69 designates a cleaning roll which is mounted upon the shaft 39 and whose function is to clean the contiguous surfaces of the apron or bolster 66. In the upper portion of the machine are located a plurality of brush rolls, as the brush roll 70 mounted on the shaft 63, the brush roll 71 mounted on the shaft 59, the brush roll 72 mounted on the shaft 16, the brush roll 73 mounted on the shaft 20, and the brush roll 74 mounted on the shaft 35, it being apparent that in the present instance I have shown five of these brush rolls which are adapted to thoroughly coat the skin with the seasoning material during its passage or travel on the bolster, although it will be apparent that the number of said brush rolls can be increased or diminished, if desired, without departing from the spirit of my invention.

76 designates a pan for the reception of the seasoning liquid, which latter is permitted to flow toward or upon the fluted roll 77, seen at the upper left hand portion of Fig. 3, whereby the seasoning liquid is conducted to the contiguous brush roll 74.

Referring now to Fig. 5, I have shown the brush rolls 71 and 70 in conjunction with my novel device for holding the skin down on the bolster 66 while traveling toward and through the brush rolls, said device consisting of a bar 78 having wires 79 secured therein by means of a set screw 80, said wire having the upwardly and outwardly curved portion 81 which is bent down and partly around a bar 78, a plurality of said wires 79 being employed and projecting preferably parallel, as will be understood from Fig. 6, and having their terminals 82 preferably turned upwardly. The manner of securing the bar 78 in position with respect to the juxtaposed brush rolls will be understood from Figs. 7 and 8, the bar 78 being supported in the guides 83, and the bottom of the bar being in contact with the cam 84 mounted on the shaft 85 having the manually operated nut 86, which is locked in position by means of the nut 87, it being apparent that by rotating the nut 86, the operative surface of the cam face can be raised or lowered according to requirements, thereby simultaneously raising or lowering the bar 78 and the wires 82 carried thereby. By means of the wing nuts 88 which are carried by the threaded stem 89, which is attached to the bar 78, it will be apparent that by manipulating said wing nuts, the bar can be locked in the desired position, so that the wires 82 will be at the desired distance away from the bolster or apron 66.

In order to properly adjust the tension of the bolster 66, the shaft 48 is moved either toward the front or toward the rear of the machine by means of the adjusting screws 90 and 91 fitted in the frame of the machine and connected to the journal boxes of the shaft 48, so that by rotating said rods 90 and 91, the drum 64 may be brought closer to or farther from the drum 65.

The shaft 48 has loosely fitted thereon a segment 92 provided with a slot 93 adapted to receive a stationary pin 94 that projects from the frame 2 so that said segment may be turned on the shaft 48 to properly locate the sprocket wheel 52 with respect to the wheel 54, after which the segment 92 may be locked in adjusted position on the pin 94 by any well known means, as the nut 95.

It will be noted that in Fig. 1 the pin 94 is not located within the slot 93 of the segment 92 and this is done with a view to more clearly illustrate certain other parts of the machine.

It will be apparent from the construction seen in Figs. 4 and 10 that the segment 92 carries the stud or pin 51, the gears 49 and 50 being always in mesh with each other.

It will be seen from Fig. 10 that when the nut or other fastening device carried by the pin 94 is loosened, the segment 92 can be rotated to a small extent about its center pin 48 and the sprocket chain 53 may be tightened or loosened to suit requirements when the nut of the pin 94 is again actuated.

During this adjusting operation the pins 48 and 51 carrying the gears 49 and 50 are always a constant distance apart, so that the intermeshing of said gears remains undisturbed no matter in what position said arm or segment 92 may be placed.

It will be understood that the various shafts which carry the drums, breast rolls, sprocket wheels and their adjuncts which have heretofore been described may be mounted and positioned in a somewhat different manner than heretofore described without departing from the spirit of my invention but I have shown in the diagrammatic view seen in Fig. 3 one preferred form of assembling and correlating these elements which I have found to give very satisfactory and efficient results in practice, the direction of movement of the brush rolls, crown shaft, sprocket chains, sprocket wheels and their coacting shafts and gearing being apparent from the diagrammatic view in Fig. 3 taken in conjunction with the perspective views in Figs. 1 and 2.

I desire to call special attention to the arrangement and collocation of the crown shaft or roller 67 which it will be understood rotates freely or as an idler and which is preferably mounted in respect to the juxtaposed roll 72 substantially as indicated in the diagrammatic view in Fig 3, so that the apron or bolster 66 travels over said crown shaft at an angle as indicated, whereby the grain side of the skin 68 will in every instance upon assuming the position seen in Fig. 3 be stretched and treated or coated and subjected to the action of the contiguous brush roll or cylinder in the manner described, which is an entirely novel feature in machines of this character.

I also desire to call attention to the novel combination and collocation of the crown shaft 67 and the juxtaposed coacting brush roll 72 in conjunction with the drums 64 and 65 which effect the progression of the bolster or apron 66 together with the cleaning roll 69, seen in Figs. 1 and 3, which combination of elements, so far as I am aware, is novel with me.

It will be apparent from Fig. 3 that I have shown the axis of the brush roll 72 as slightly out of alinement with the axis of the crown shaft or crown roller or idler 67 but it will be apparent that if desired the axes of said breast roll 72 and crown shaft 67 may be in vertical alinement or may be adjustable with respect to each other, as will be evident from the construction seen in Fig. 11, wherein I have shown the bearings for the crown shaft 67 as capable of lateral adjustment with respect to the bearings for the brush roll 72. In said Fig. 11 I have shown one form of bearings for said crown shaft 67, the journals of the latter being rotatably mounted in the bar 96 having the slots 97 in the ends thereof, said slots being engaged by the bolts 98, so that upon loosening said bolts, the bar 96 can be adjusted in either direction according to requirements.

In the operation of the seasoning of a skin, the operator stands at the front of the machine seen in Fig. 1. The skins to be treated are placed on the upwardly inclined portion of the apron or bolster 66, seen in Fig. 1, and passed initially beneath the front brush roll or cylinder 74 which is always wet with the seasoning liquor conveyed to it by the fluted roll 77, it being apparent that each of the flutes in said roll 77 carry down to the brush roll 74 a fixed quantity of the seasoning liquor.

It will be apparent that the front brush roll 74 which preferably revolves at about fifty revolutions per minute initially applies the seasoning liquor to the outer surface of the skin, said seasoning liquor being rubbed into the body of the skin as the latter advances by the four succeeding brush rolls 73, 72, 71 and 70, as will be understood from the diagrammatic view in Fig. 3.

I preferably drive such brush rolls in such a manner that each successive brush roll rotates at a progressively increasing speed. For example, in practice, I drive the initial brush roll 74 at the rate of about fifty revolutions per minute, the brush roll 73 at about 69 revolutions per minute, the brush roll or cylinder 72 at about 110 revolutions per minute, while the brush cylinder 71 revolves at about one hundred and thirty revolutions per minute, and the brush cylinder 70 at about one hundred and fifty revolutions per minute.

The foregoing comparative speed of revolution of the various brush rolls or cylinders is what may be usually employed for seasoning all skins generally treated in machines of this character. It will, however, be understood that the speed of revolution of the brush rolls can be progressively increased or diminished according to the condition of the skin at the time it is ready for the seasoning operation, which applies to calf skins, sheep skins, side leather or kip skins, and while the above approximate speeds of revolution are preferable it will of course be apparent that I do not desire to be limited to any particular speed or comparative speed of rotation of the various brush rolls, it being understood that the above suggested speed of revolutions per minute for the various brush rolls are stated for the purpose of illustration of the capabilities of my machine, and that in practice these brush cylinders may be driven at any other or desired speeds, according to requirements.

Attention is called to the fact that it is ordinarily desirable or preferable to rotate the brush roll 72 which is juxtaposed to and coacts with the crown shaft 77 at a considerably higher rate of speed than the brush roll 73, for the reason that when the skin 68 reaches the position indicated in Fig. 3, the skin being somewhat stretched, the contiguous brush roll 72 not only has the dual function of rubbing the seasoning liquor into the skin but in addition it also serves to propel or advance the skin over and around the apex of the angle formed by the crown shaft under the endless apron or bolster 66, said brush roll 72 serving also to exert a pull upon the skin while it is held tightly between the crown shaft and juxtaposed brush roll, so that while said skin is passing over the crown shaft, it is in a taut or stretched condition.

The outer or grain surface of the skin being straightened and stretched efficiently on said grain side, into which the seasoning is to be rubbed during its passage over the crown shaft, the seasoning consequently penetrates the grain of the skin much more thoroughly and efficiently by reason of its stretched or opened out condition and it is obvious that a much better and more uniform product is obtained and the liability of having portions of the skin remaining unseasoned or of having too great a quantity of the seasoning material on any one or more points of the skin is entirely eliminated.

It will be understood by those skilled in this art that very few skins at this stage of their finishing lie out flat or straight. On the other hand, they are as a rule more or less frilled or stand up especially about the flanks and brisket of the skins. As these frilled up portions of the skin pass under the brush rolls, the tendency and difficulty heretofore has always been that the frilled portions would be folded or plaited, making three thicknesses of leather instead of one. When this happens, it will be clear that a double surface of the skin under the plait could not be acted upon by the brush roll, this being what is termed a "skip." At other times, what is termed a "pocket" would be formed in which the seasoning liquid would lie and afterward cake. The result of this caking would be that the skin would be marked wherever a cake had existed. My novel crown shaft has the function of spreading out all plaited or frilled portions of the skin, so that by the time the skin has passed over the angle formed by the crown shaft the same is flat and straight. It will be apparent that the formation of all frills, plaits, "skips" or pockets are avoided by my novel construction, as the skin in its passage over the crown shaft is spread out preferably flat and in that condition is acted upon by the brush roll 72, it being apparent that the upper stretch of the apron 66 owing to the position of the crown shaft 67 moves in an upwardly inclined plane, as will be understood from Figs. 1 and 3, then passes around the crown shaft or roll 67 and then travels in a downwardly inclined plane, as seen in Fig. 2.

By the provision of the novel skin guiding and holding means, seen in Figs. 5 to 8, I am enabled to adjust the position thereof with respect to the skin 68, it being seen that the lower portions of the wires or rods 79 extend substantially parallel to the apron 66 while their other extremities are curved in a semi-circular or other form and connected to a bar which is operatively mounted with respect to the adjusting eccentrics.

It will now be apparent that I have devised a new and useful machine for seasoning or finishing leather which embodies the features of advantage enumerated as desirable in the statement of the invention and the above description, and while I have, in the present instance, shown and described preferred embodiments thereof which will give in practice satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:—

1. In a leather finishing machine, a brush roll, means to bring a skin into operative relationship with said brush roll, and means comprising a crown shaft rotating as an idler and an endless apron passing upwardly and downwardly thereover for stretching and opening the grain side of said skin when it is in proximity to said brush roll.

2. In a leather finishing machine a skin carrying apron, means to actuate it, a brush roll, means comprising a crown shaft rotating as an idler and an endless apron passing upwardly and downwardly thereover for producing a crown or bend in said apron in proximity to its point of contact with said brush roll, and means to actuate said brush roll.

3. In a leather finishing machine, a brush roll, a skin carrying apron, means comprising a crown shaft rotating as an idler over which said apron passes upwardly and downwardly for causing the upper surface of the skin placed on said apron to be stretched or opened in proximity to the point of its contact with said brush roll, means to actuate said apron, and means to actuate said brush roll.

4. In a leather finishing machine, a skin carrying apron, means to actuate it, means comprising a rotatable crown shaft located above and substantially midway between the outer portions of said apron for producing a crown or bend in said apron, a brush roll for initially applying seasoning liquor to said skin, and a second brush roll located in proximity to said crown.

5. In a leather finishing machine, a skin carrying apron, means to actuate it, means comprising a freely rotatable crown shaft located above and substantially midway between the outer portions of said apron for producing a crown or bend in said apron, said crown shaft being located below said apron at the apex of the angle formed at the upper portion thereof, a brush roll for initially applying seasoning liquor to said skin, and a second brush roll located in proximity to said crown, in combination with means to rotate said brush rolls at varying rates of speed.

6. In a leather finishing machine, a brush roll, a traveling apron having a crown therein, a rotatable crown shaft located below said apron at the apex or crown thereof, said apron being adapted to bring a skin into operative relationship with said brush roll, and means for cleaning said apron.

7. In a leather finishing machine, a plurality of drums, a rotatable crown shaft located above said drums, an endless apron passing over said drums and upwardly and downwardly over said crown shaft, a brush roll located above said apron in proximity to said crown shaft, and means for rotating said drums and brush roll.

8. In a leather finishing machine, a plurality of drums, a freely rotatable crown shaft located above said drums, an endless apron passing over said drums and upwardly and downwardly over said crown shaft, and brush rolls rotatably mounted above said apron and in proximity thereto.

9. In a leather finishing machine, a plurality of drums, a freely rotatable crown shaft located above said drums, an endless apron passing over said drums and upwardly and downwardly over said crown shaft, a brush roll for initially applying a liquor to the skin to be treated and other brush rolls for rubbing said liquor into said skin.

10. In a leather finishing machine, a plurality of drums, a freely rotatable crown shaft located above said drums, an endless apron passing over said drums and upwardly and downwardly over said crown shaft, a brush roll for initially applying a liquor to the skin to be treated, and additional brush rolls located in proximity to said apron, for rubbing said liquor into said skin.

11. In a leather finishing machine, a skin carrying apron, means to cause its upper stretch to travel in an upwardly inclined direction and then in a downwardly inclined direction, means to actuate said apron, a plurality of brush rolls and means to cause successive brush rolls to rotate at progressively increasing speeds.

12. In a leather finishing machine, a skin carrying apron, end drums around which said apron passes, a crown shaft intermediate said drums and located thereabove to cause the upper stretch of the apron to travel in an upwardly inclined plane and then in a downwardly inclined plane, brush rolls coöperating with the upper surface of said apron, one of said brush rolls being mounted in proximity to said crown shaft, means to actuate said rolls, and means to actuate said brush cylinders.

13. In a leather finishing machine, a plurality of drums, a freely rotatable crown shaft located above said drums, an endless apron passing over said drums and upwardly and downwardly over said crown shaft, a brush roll for initially applying a liquor to the skin to be treated, a brush roll located in proximity to said crown shaft and adapted to rotate at a higher speed than said first mentioned brush roll, and other brush rolls located above said apron.

14. In a leather finishing machine, a plurality of drums, a freely rotatable crown shaft located above said drums, an endless apron passing over said drums and upwardly and downwardly over said crown shaft, a brush roll for initially applying a liquor to said skin, a second brush roll located above said apron and adapted to rotate at a higher rate of speed, a third brush roll located in proximity to said crown shaft, and adapted to rotate at a still higher speed, and other brush rolls located at the rear of said machine above said apron.

15. In a leather finishing machine, an apron adapted to support a skin, means to actuate said apron, a plurality of skin guiding and holding devices having one extremity substantially parallel with said apron and the other extremity curved in semicircular form, and means to support said devices.

16. In a leather finishing machine, an apron adapted to support a skin, means to actuate said apron, a plurality of skin guiding and holding devices having one extremity extending parallel with said apron and the other extremity curved, a bar connected with the free end of the curved portion of the devices, and means to support and adjust said bar.

17. In a leather finishing machine, a plurality of rods adapted to hold down or guide a skin during its passage through the machine, said rods extending substantially parallel to the line of travel of the skin, a bar for supporting said rods, and cam means operatively connected with said bar to adjust its position.

18. In a leather finishing machine, a pair of drums, a crown shaft located above said drums, an endless apron passing around said drums and upwardly and downwardly over said crown shaft, a brush roll located above said apron, means for actuating said drums and brush roll, and means for adjusting the tension of said apron.

19. In a leather finishing machine, a plurality of drums, a freely rotatable crown shaft located above said drums, an endless apron passing over said drums and upwardly and downwardly over said crown shaft, a brush roll located above said apron, means for actuating said drums and brush roll, and means for cleaning said apron.

20. In a leather finishing machine, a pair of drums, a crown shaft located above said drums, an endless apron passing around said drums and upwardly and downwardly over said crown shaft, a brush roll located above said apron, means for actuating said drums and brush roll, means for adjusting the tension of said apron, and means for cleaning said apron.

JAMES U. FLANAGAN.

Witnesses:
E. HAYWARD FAIRBANKS,
FRANK I. SLOCOMB.

Copies of this patent may be obtained for five cents each, by addressing the "Commissioner of Patents, Washington, D. C."